(12) United States Patent
Bartos et al.

(10) Patent No.: US 10,656,004 B2
(45) Date of Patent: May 19, 2020

(54) MEASURING DEVICE AND METHOD FOR MEASURING THE LEVEL OF A LIQUID IN A CONTAINER

(71) Applicant: TE Connectivity Sensors Germany GmbH, Dortmund (DE)

(72) Inventors: Axel Bartos, Waltrop (DE); Armin Meisenberg, Dortmund (DE); Andreas Voss, Dortmund (DE)

(73) Assignee: TE CONNECTIVITY SENSORS GERMANY GMBH, Dortmund (DE)

(*) Notice: Subject to any disclaimer, the term of this patent is extended or adjusted under 35 U.S.C. 154(b) by 424 days.

(21) Appl. No.: 15/341,157

(22) Filed: Nov. 2, 2016

(65) Prior Publication Data

US 2017/0074715 A1    Mar. 16, 2017

Related U.S. Application Data

(63) Continuation of application No. PCT/EP2015/000898, filed on Apr. 30, 2015.

(30) Foreign Application Priority Data

May 2, 2014 (DE) .................. 10 2014 006 276

(51) Int. Cl.
 *G01F 23/74* (2006.01)
 *G01F 23/76* (2006.01)
 *G01F 23/72* (2006.01)

(52) U.S. Cl.
 CPC ............. *G01F 23/74* (2013.01); *G01F 23/72* (2013.01); *G01F 23/76* (2013.01)

(58) Field of Classification Search
 CPC ................................ G01F 23/74; G01F 23/72

USPC .......................................................... 73/292
See application file for complete search history.

(56) References Cited

U.S. PATENT DOCUMENTS

| 2,920,484 A | 1/1960 | Reichert |
| 3,982,087 A | 9/1976 | Bachman |
| 4,589,282 A | 5/1986 | Dumery |
| 5,056,049 A | 10/1991 | O'Neill |

(Continued)

FOREIGN PATENT DOCUMENTS

| CN | 201662254 U | 12/2010 |
| CN | 103791984 A | 5/2014 |

(Continued)

OTHER PUBLICATIONS

Abstract of DE2604894, dated Sep. 9, 1976, 1 page.

(Continued)

*Primary Examiner* — John Fitzgerald
*Assistant Examiner* — Rodney T Frank

(57) ABSTRACT

A measuring device for measuring a level of a liquid in a container is disclosed. The measuring device comprises a sensor line and a float. The sensor line has a plurality of magnetic-field sensors, at least one of the plurality of magnetic-field sensors uses a magnetoresistive effect or is a Hall effect sensor or a magnetoresistor or an extraordinary magnetoresistive sensor. The float is movable along and relative to the sensor line between a first measuring location and a second measuring location. The float has a magnet generating a magnetic field extending substantially parallel to the sensor line at both the first measuring location and the second measuring location.

18 Claims, 19 Drawing Sheets

(56) References Cited

U.S. PATENT DOCUMENTS

| | | | |
|---|---|---|---|
| 5,103,673 | A | 4/1992 | Sawada et al. |
| 5,743,137 | A | 4/1998 | Brown et al. |
| 6,502,461 | B2 * | 1/2003 | Keller .................. G01F 23/38 |
| | | | 73/290 R |
| 6,923,057 | B2 * | 8/2005 | Sabatino ............... G01F 23/242 |
| | | | 73/290 R |
| 9,297,634 | B2 | 3/2016 | Bartos et al. |
| 2003/0192599 | A1 | 10/2003 | Aoyama |
| 2005/0189938 | A1 | 9/2005 | Schley et al. |
| 2013/0049743 | A1 | 2/2013 | Sawano |
| 2013/0200887 | A1 | 8/2013 | Bartos et al. |

FOREIGN PATENT DOCUMENTS

| | | |
|---|---|---|
| DE | 2604894 A1 | 9/1976 |
| DE | 3241250 A1 | 5/1984 |
| DE | 29613673 U1 | 9/1996 |
| DE | 19925185 A1 | 12/2000 |
| DE | 19935652 A1 | 3/2001 |
| DE | 10156479 A1 | 5/2003 |
| DE | 10327372 A1 | 1/2005 |
| DE | 102010025170 B4 | 2/2013 |
| DE | 102010050765 B9 | 8/2013 |
| GB | 1395075 | 5/1975 |
| JP | 59040212 A | 3/1984 |
| JP | 2001152994 A | 6/2001 |
| JP | 2002071431 A | 3/2002 |
| JP | 2002-174544 A | 6/2002 |
| JP | 2002-357474 A | 12/2002 |

OTHER PUBLICATIONS

Abstract of DE10327372, dated Jan. 20, 2005, 1 page.
Abstract of JP2001152994, dated Jun. 5, 2001, 1 page.
Abstract of JP2002071431, dated Mar. 8, 2002, 1 page.
PCT International Search Report, International Application No. PCT/EP2015/000898, dated Sep. 8, 2015, 4 pages.
German Office Action, dated Dec. 4, 2014, 6 pages.
Abstract of DE3241250, dated May 10, 1984, 1 page.
Abstract of DE10156479, dated May 28, 2003, 1 page.
Abstract of DE19935652, dated Mar. 8, 2001, 1 page.
Abstract of DE19925185, dated Dec. 21, 2000, 2 pages.
European Communication, European Patent Application No. 15 723 429.5, dated Jan. 4, 2018, 8 pages.
Chinese First Office Action, with English translation, dated Sep. 30, 2018, 29 pages.
Abstract of CN 201662254 U dated Dec. 1, 2010, 1 page.
Abstract of CN 103791984 A, dated May 14, 2014, 1 page.
Korean Office Action with English translation, Korean Patent Application No. 10-2016-7033813, dated Mar. 15, 2019, 14 pages.
Abstract of JP 2002-174544 A, dated Jun. 21, 2002, 1 page.
Abstract of JP 2002-357474 A, dated Dec. 13, 2002, 1 page.
Chinese Second Office Action with English translation, Chinese Patent Application No. 201580022287.0, dated May 8, 2019, 22 pages.
Co-Pending Chinese Patent Application No. 201580022287, Rejection Decision dated Nov. 2, 2019. Translation document 15 pages; Original document 7 pages.
Examination Report, Indian Patent Application No. 201647040688, dated Mar. 27, 2019, 6 pages.

* cited by examiner

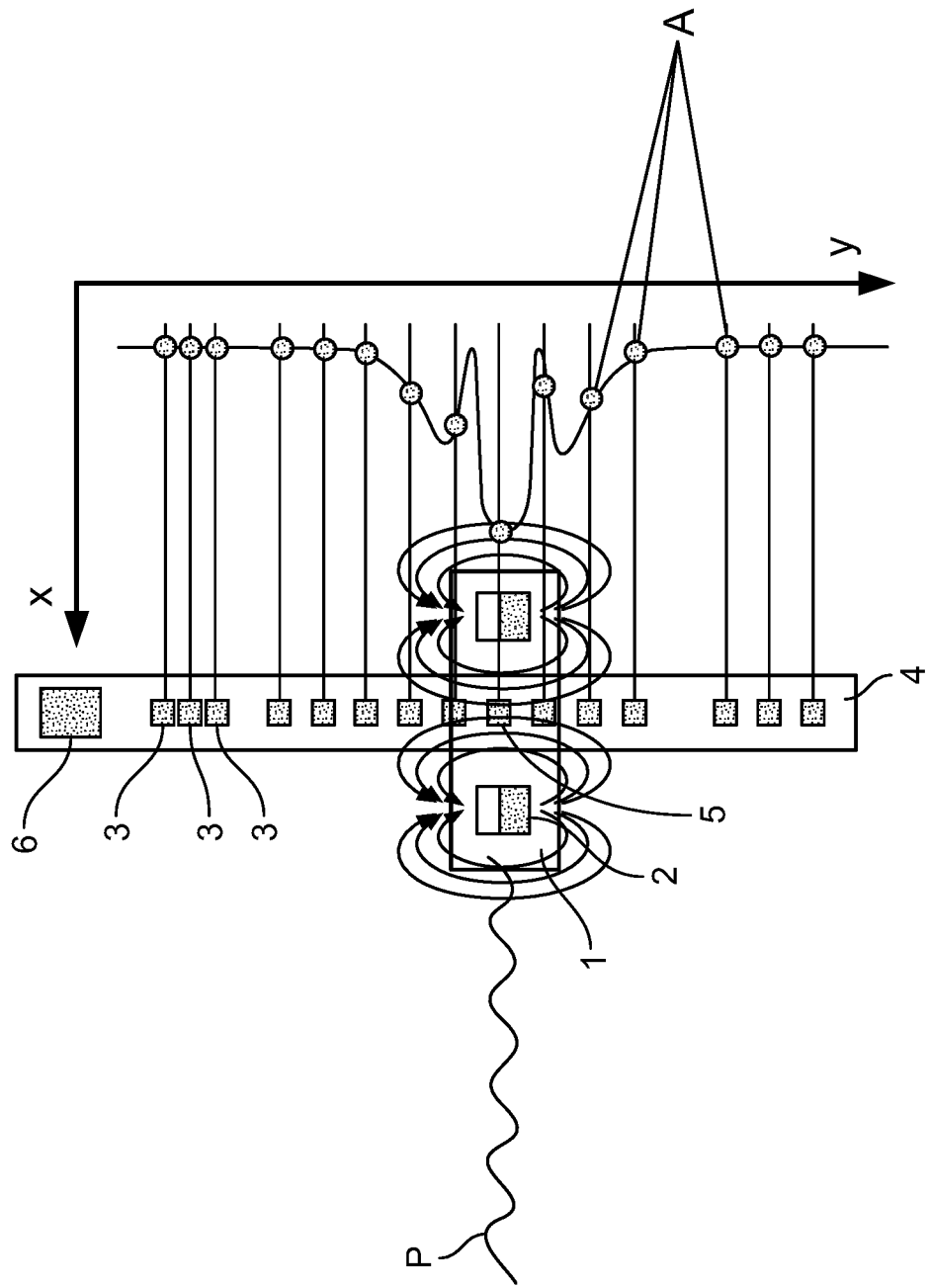

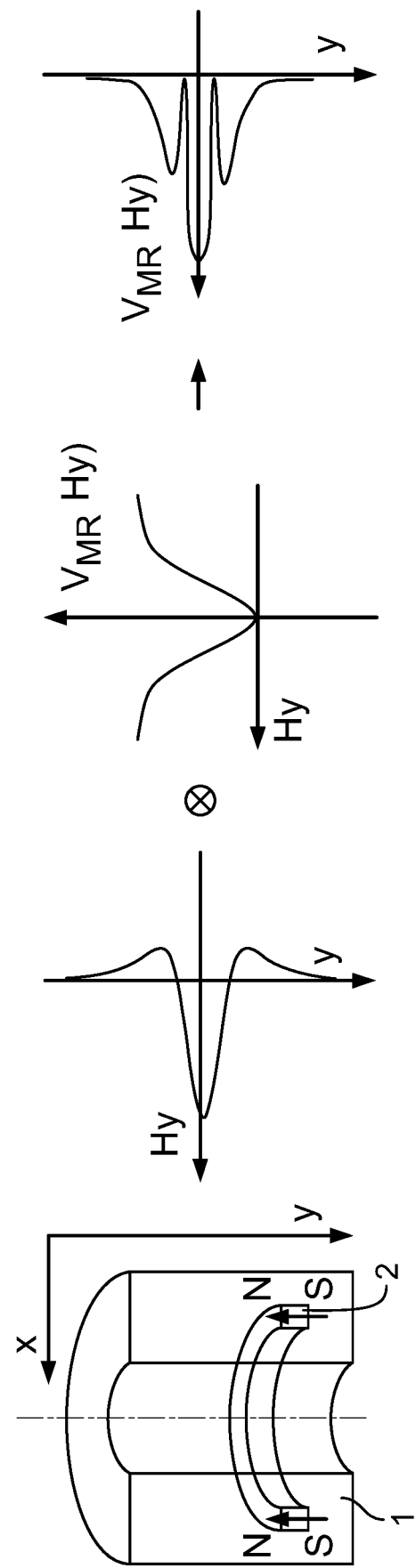

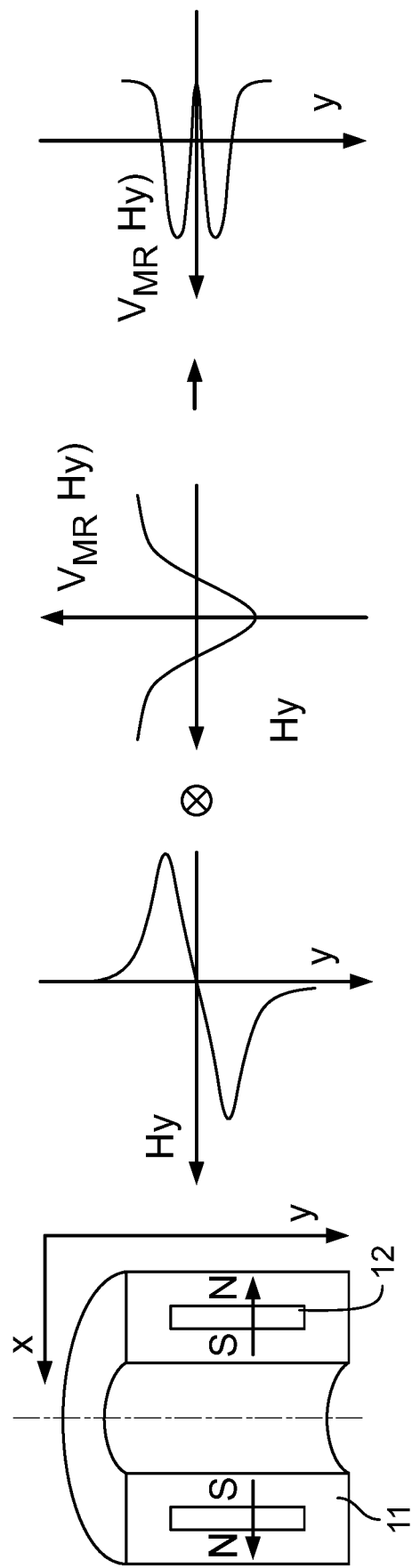

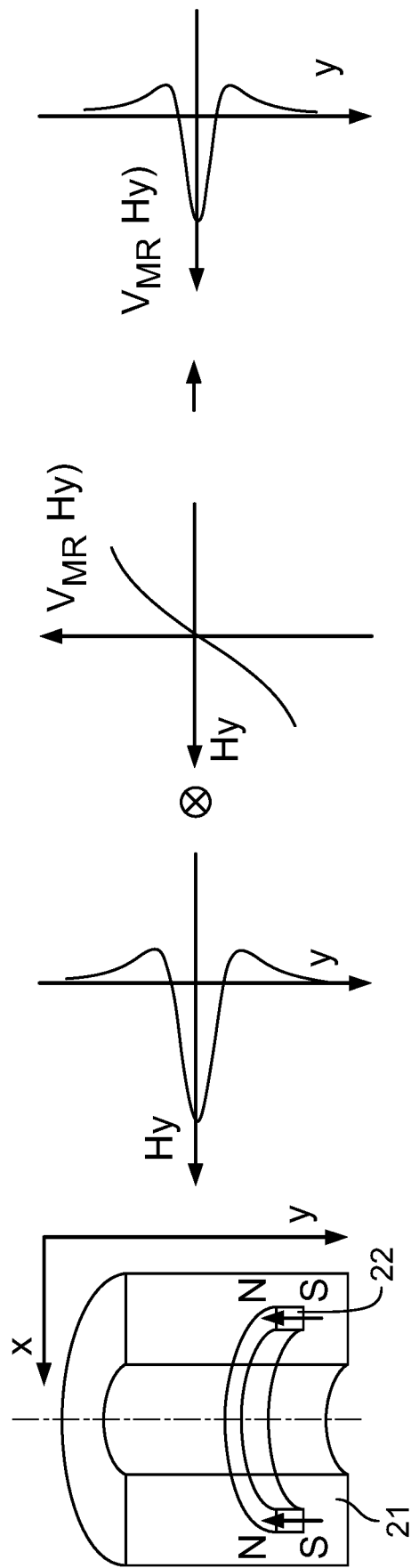

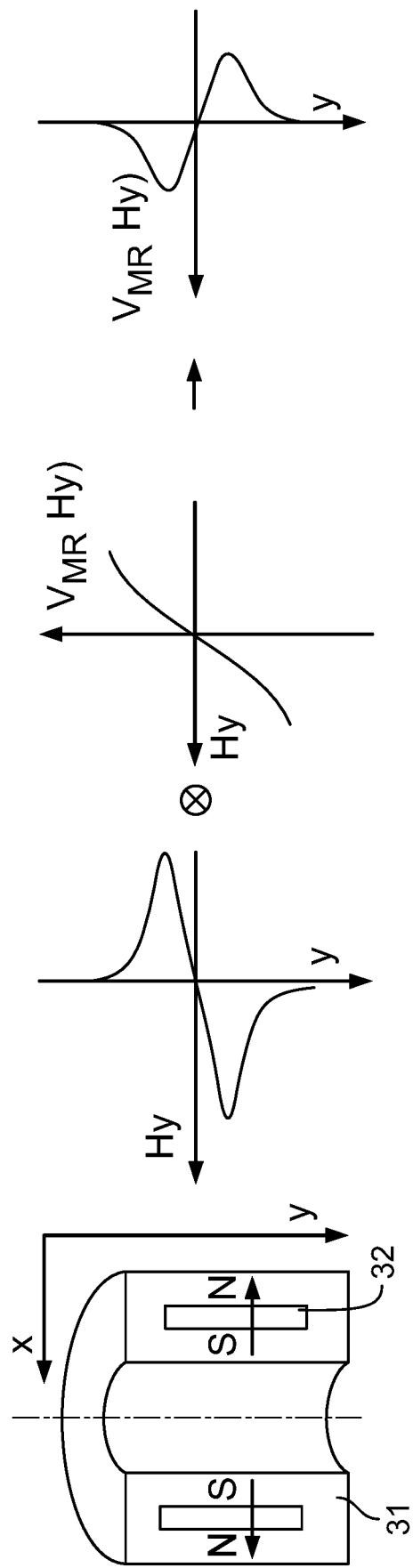

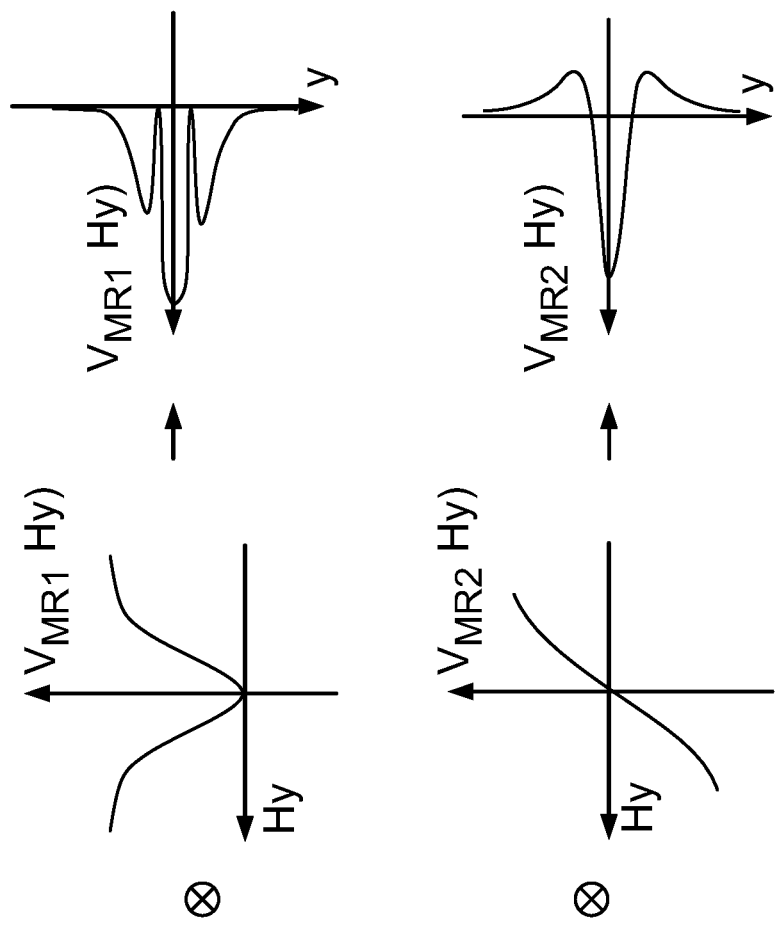
Fig. 25
Fig. 24
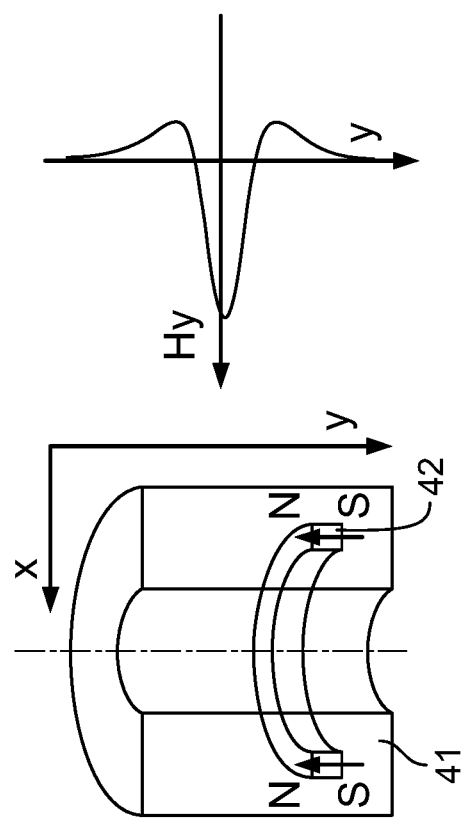
Fig. 23
Fig. 22

MEASURING DEVICE AND METHOD FOR MEASURING THE LEVEL OF A LIQUID IN A CONTAINER

CROSS-REFERENCE TO RELATED APPLICATIONS

This application is a continuation of PCT International Application No. PCT/EP2015/000898, filed on Apr. 30, 2015, which claims priority under 35 U.S.C. § 119 to German Patent Application No. 102014006276.7, filed on May 2, 2014.

FIELD OF THE INVENTION

The invention relates to a measuring device, and more particularly, to a measuring device for measuring the level of a liquid in a container.

BACKGROUND

In the prior art, for measuring a height of a liquid compared to a reference height, it is known to employ floats which float on the liquid to ascertain the level of the liquid in the container by determining the position of the float in the container. It is further known to use magnetically sensitive sensors for measuring the level of a liquid. From DE 101 56 479 A1, it is known to employ a rotatably borne lever arm with a float attached to an end of the lever arm and the rotatably borne end connected to a ring magnet. The lever arm also has a sensor, and when the lever is moved, the ring magnet is moved with it, altering the magnetic influence of the magnet on the sensor which brings about an output signal corresponding to the liquid level. The sensor is a programmable Hall effect sensor. From DE 199 35 652 A1 it is known to connect a magnet to the float and to provide a sensor outside of the float's path of movement. The sensor measures the change in direction of the field lines of a magnetic field generated by the magnet depending on the position of the magnet moved by the float. The position of the float can be reproduced electrically on a display. From DE 199 25 185 A1 it is known to provide a float which is rotatably borne around an axis of rotation, and to mount at the axis of rotation of the float a magnet opposite a magnetic field sensor disposed in the interior of a pipe. The sensor sends a signal dependent on the angular position of the float to an evaluation apparatus via an electric line.

Further, from U.S. Pat. No. 3,982,087, GB 1395 075 and DE 32 41 250 A1 measuring devices are known for measuring the level of a liquid in a container in which reed contacts are employed as magnetically sensitive sensors. Reed contacts have movable components, however, and are not particularly well suited for use in containers installed in vehicles; the vibrations which occur during travel can damage the reed contacts. In measuring devices which employ reed contacts, a range of reed contacts are used which are sealed off in a housing from the liquid. The level of the liquid is detected through the switching of a respective reed contact. The precision of the system therefore depends on the size of the reed contacts and the number thereof per section of the measurement path. With such liquid level measuring devices using reed contacts, a precision of 10 to 20 mm is typically obtained.

SUMMARY

An object of the invention, among others, is to provide a measuring device which can more precisely measure the level of liquid in a container. The disclosed measuring device comprises a sensor line and a float. The sensor line has a plurality of magnetic-field sensors, at least one of the plurality of magnetic-field sensors uses a magnetoresistive effect or is a Hall effect sensor or a magnetoresistor or an extraordinary magnetoresistive sensor. The float is movable along and relative to the sensor line between a first measuring location and a second measuring location. The float has a magnet generating a magnetic field extending substantially parallel to the sensor line at both the first measuring location and the second measuring location.

BRIEF DESCRIPTION OF THE DRAWINGS

The invention will now be described by way of example with reference to the accompanying figures, of which:

FIG. 1 is a schematic view of a measuring device for measuring a level of liquid in a container according to the invention;

FIG. 2 is a sectional view of a float of the measuring device of FIG. 1;

FIG. 3 is a graph of a magnetic field generated by a magnet of the float of FIG. 2;

FIG. 4 is a graph of a sensor output signal of the measuring device of FIG. 1;

FIG. 5 is a graph of a sensor output curve of the measuring device of FIG. 1;

FIG. 7 is a sectional view of a float of the measuring device of FIG. 6;

FIG. 8 is a graph of a magnetic field generated by a magnet of the float of FIG. 7;

FIG. 9 is a graph of a sensor output signal of the measuring device of FIG. 6;

FIG. 10 is a graph of a sensor output curve of the measuring device of FIG. 6;

FIG. 12 is a sectional view of a float of the measuring device of FIG. 11;

FIG. 13 is a graph of a magnetic field generated by a magnet of the float of FIG. 12;

FIG. 14 is a graph of a sensor output signal of the measuring device of FIG. 11;

FIG. 15 is a graph of a sensor output curve of the measuring device of FIG. 11;

FIG. 17 is a sectional view of a float of the measuring device of FIG. 16;

FIG. 18 is a graph of a magnetic field generated by a magnet of the float of FIG. 17;

FIG. 19 is a graph of a sensor output signal of the measuring device of FIG. 16;

FIG. 20 is a graph of a sensor output curve of the measuring device of FIG. 16;

FIG. 22 is a sectional view of a float of the measuring device of FIG. 21;

FIG. 23 is a graph of a magnetic field generated by a magnet of the float of FIG. 22;

FIG. 24 is a graph of sensor output signals of the measuring device of FIG. 21;

FIG. 25 is a graph of sensor output curves of the measuring device of FIG. 21;

DETAILED DESCRIPTION OF THE EMBODIMENT(S)

Figure 6:
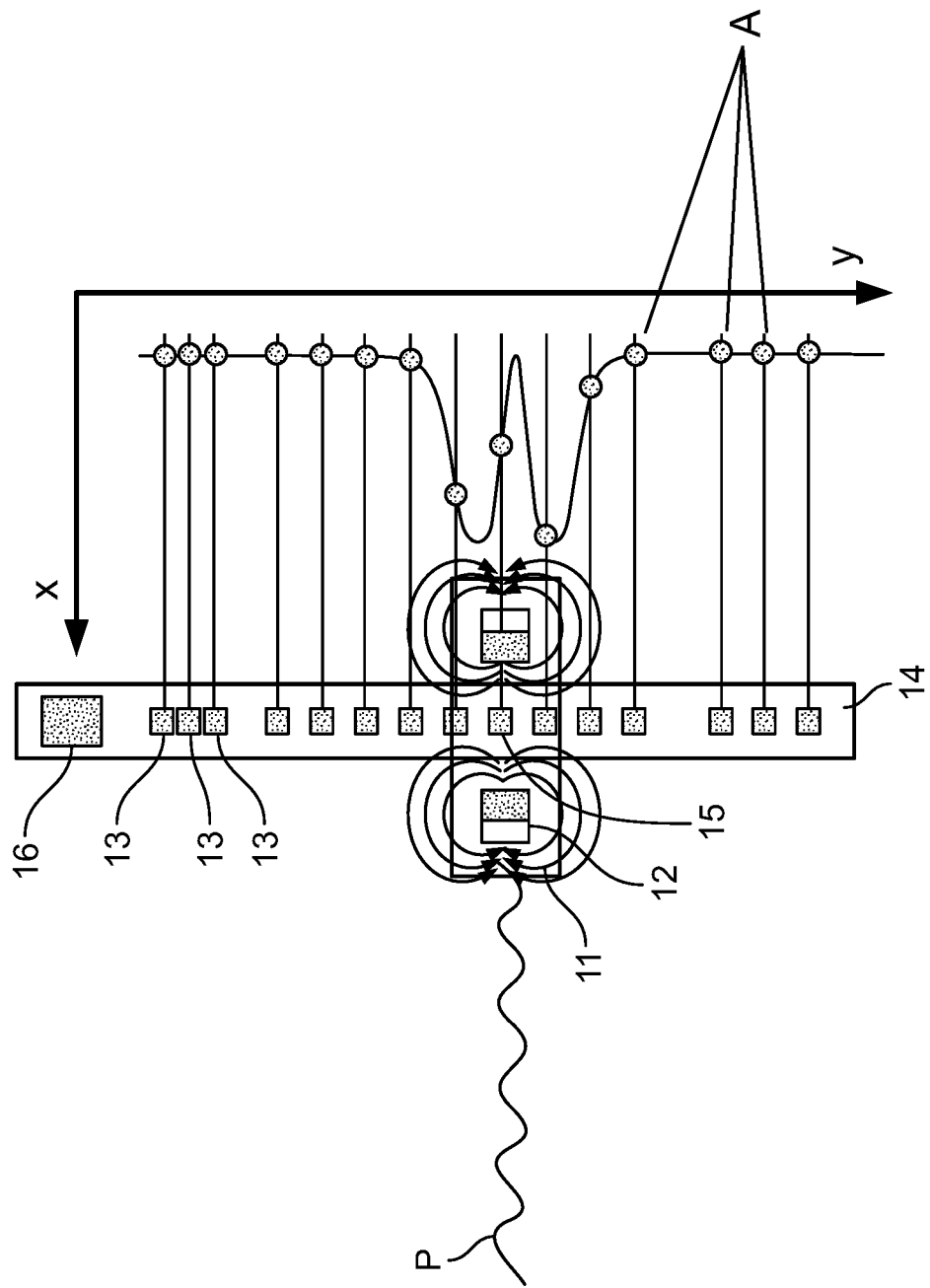
FIG. 6 is a schematic view of a measuring device for measuring a level of liquid in a container according to the invention.
Figure 11:
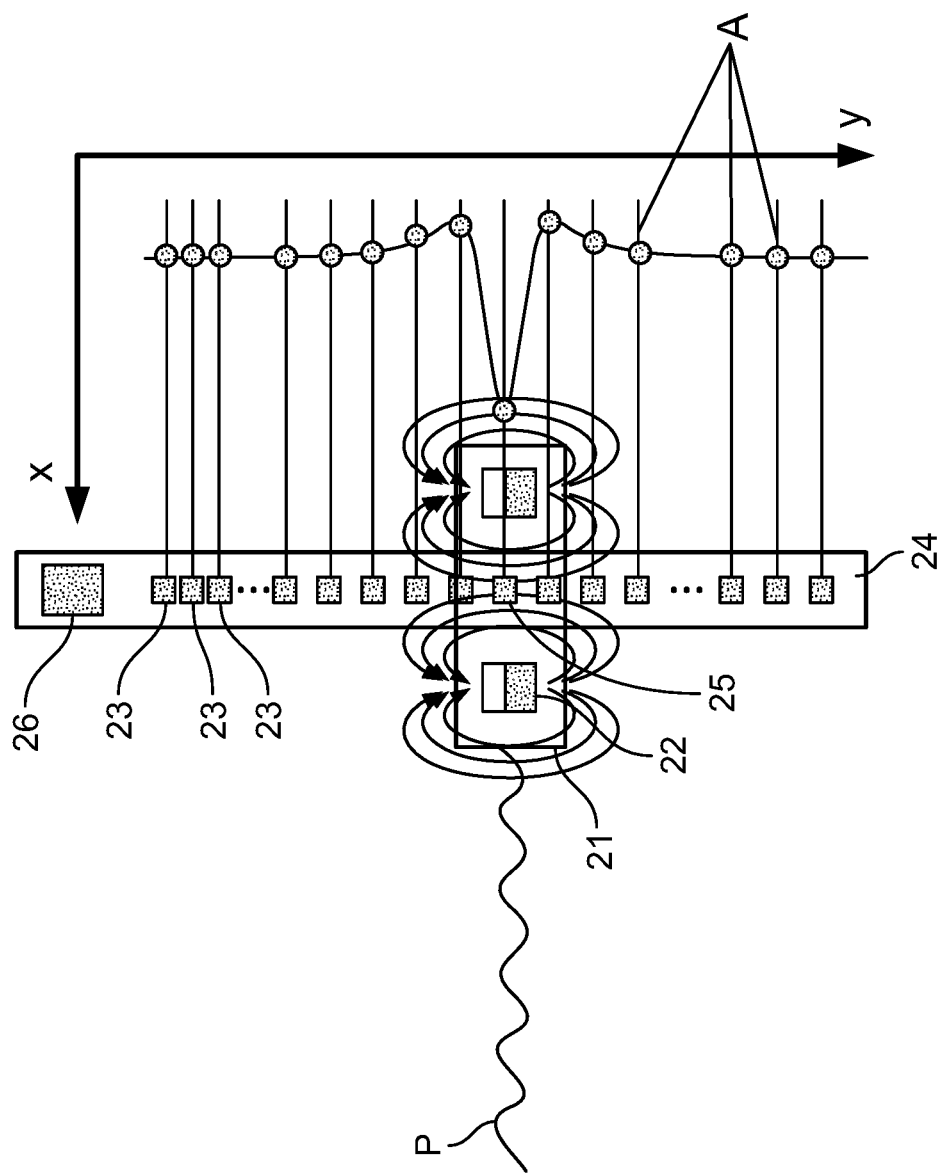
FIG. 11 is a schematic view of a measuring device for measuring a level of liquid in a container according to the invention.

The invention is explained in greater detail below with reference to embodiments of a measuring device for measuring a level of liquid in a container. This invention may, however, be embodied in many different forms and should not be construed as limited to the embodiments set forth herein; rather, these embodiments are provided so that this disclosure will be thorough and complete and still fully convey the scope of the invention to those skilled in the art.

A measuring device for measuring a level P of liquid in a container according to an embodiment of the invention is shown in FIGS. 1-5. The measuring device has a float 1 with a magnet 2, as shown in FIG. 2. The magnet 2 is a permanent magnet formed as a hollow cylinder. The measuring device also has a sensor line 4. The sensor line 4 extends linearly and is formed from a plurality of magnetic-field sensors 3 disposed spaced apart from one another along the sensor line 4.

The magnetic-field sensors 3 contain no movable components. Each of the magnetic-field sensors 3 uses a magnetoresistive effect or is a Hall effect sensor or a magnetoresistor or an extraordinary magnetoresistive ("EMR") sensor. Each sensor 3 can have the anisotropic-magnetoresistive ("AMR") effect or the gigantic magnetoresistive ("GMR") effect. The sensor 3 can, however, also have other effects, such as the giant magneto impedance ("GMI") effect or the tunnel magneto resistance ("TMR") effect, for example. A magnetoresistor, also called a Magnetic Dependent Resistor ("MDR"), is understood to be a sensor 3 composed of semiconductors, which reacts to magnetic fields through a change in the electrical resistance.

In the shown embodiment, the sensor line has fifteen magnetic-field sensors 3, but as would be understood by one with ordinary skill in the art, the number of magnetic-field sensors 3 could vary. A longitudinal axis of the magnet 2 is aligned parallel to the measurement path formed by the sensor line 2, and the magnet 2 is magnetized parallel to the longitudinal axis. The measuring device further has an evaluation unit 6.

The float 1, as shown in FIG. 1, is disposed at a measuring location relative to the sensor line 4. If the level P of the liquid changes, the float 1 floating on the liquid moves along the sensor line 4 to another relative position relative to the sensor line 4. At the measuring location shown in FIG. 1, a magnetic field generated by the float 1 extends substantially parallel to the sensor line 4 at the location of a first sensor 5 of the magnetic-field sensors 3. If the float 1 moves to another position relative to the sensor line 4, the magnetic field generated by the float 1 extends substantially parallel to a different portion of the sensor line 4.

The plurality of magnetic-field sensors 3, as shown in FIG. 1, are not disposed equidistantly along the sensor line 4. Consequently, along the sensor line 4, some regions can detect the level P of liquid with greater precision when there are a larger number of sensors 3 in the given region, and some regions can only detect the level P with lower precision.

The plurality of magnetic-field sensors 3, as shown in FIG. 4, are unipolar sensors. Each magnetic-field sensor 3 outputs an output signal independent of the magnetic field direction, or independent of the north-south alignment of the magnet 2. Such sensors 3 can also be employed in the measuring device according to the invention without employing a support field. Unipolar sensors 3 are, for example, AMR sensors without the influence of a separate support field with a defined field direction, as described in DE 103 42 260 A1 for example. Since the output signal of the sensor 3 does not flip and no support field is required, the output signal supports the precise determination of float 1 position.

The points A shown in FIG. 1 represent the output signals of the individual sensors 3 when the float 1 is positioned as shown in FIG. 1. The float 1 having the magnet 2 generates a magnetic field as shown in FIG. 3. The curve of points A shows the progression of output signals of respective sensors 3 outputting the unipolar output signal shown in FIG. 4, the sensors 3 detecting the magnetic field of FIG. 3 along the signal line 4.

The curve of points A can be stored in the evaluation unit 6 in a memory or can be generated from a curve progression stored in the memory. The memory is a non-transitory computer-readable medium. In order to detect the location of the float 1, the curve shown in FIG. 5 is mathematically moved along in the y-direction of the diagram in comparison to values stored in the memory until it occupies the best-fit position shown in FIG. 1, minimizing the measurement value errors for the points A. The position of the float 1 can be determined from the thus-detected best-fit location of the curve laid over the points A.

Additionally, by a temperature compensation executed by the evaluation unit 6, which keeps the output signal temperature independent at approximately the middle of the output voltage range, the temperature dependency of the output voltages can be minimized, permitting better conversion of the output signals. If a simple Wheatstone bridge with resistance strips disposed orthogonally to one another is used as the sensor 3, a higher sensor resistance can be achieved with a low sensor surface requirement.

A measuring device for measuring a level P of liquid in a container according to another embodiment of the invention is shown in FIGS. 6-10. The measuring device shown in FIG. 6 has a hollow cylindrical magnet 12 shown in FIG. 7 with a longitudinal axis aligned parallel to a sensor line 14. In contrast to the magnet 2 of the embodiment of FIG. 1, the magnet 12, as shown in FIGS. 6 and 7, is magnetized radially or orthogonally with respect to the longitudinal axis. The sensors 13 of the sensor line 14 are the same type as the sensors 3 of the first embodiment; other similar structural elements are depicted with reference numbers ending in the same numbers as in the embodiment of FIGS. 1-5.

Compared to axially magnetized magnets 2, due to radial magnetization, the magnets 12 generate a magnetic field shown in FIG. 8 which, when detected by the sensors 13, produces an output curve as shown in FIG. 10. The detected curve of the radially magnetized magnets 12 shown in FIG. 10 has fewer flanks or changes of direction than the curve of the axially magnetized magnets 2 shown in FIG. 5. Due to the fewer flanks, a lower sensor 13 density along the sensor line 14 is sufficient for a determination of float 11 position.

A measuring device for measuring a level P of liquid in a container according to another embodiment of the invention is shown in FIGS. 11-15. The measuring device shown in FIG. 11 has a hollow cylindrical magnet 22 shown in FIG. 12 with a longitudinal axis aligned parallel to a sensor line 24. The magnet 22 is magnetized axially with respect to the longitudinal axis. In the shown embodiment, the sensors 23 of the sensor line 24 are magnetoresistive sensors with barber-pole structures. The sensors 23 could alternatively be Wheatstone bridges with resistance strips positioned orthogonal to one another and inclined by 45° on average relative to the sensor line 24 longitudinal direction. Other similar structural elements are depicted with reference numbers ending in the same numerals as in the embodiment of FIGS. 1-5.

The sensor line 24, as shown in FIGS. 11-15, has a support field oriented orthogonally to a longitudinal direction of the sensor line 24. The support field stabilizes the output curve shown in FIG. 15, as described in DE 10 2010 025 170 B4, for example. The sensor 23 output signal shown in FIG. 14 is dependent on the north-south alignment of the magnetic field of FIG. 13 generated by the float 21, and decreases the ambiguities when determining the float 21 position, enabling a reduction in the sensor 23 density along the sensor line 24.

Figure 16:
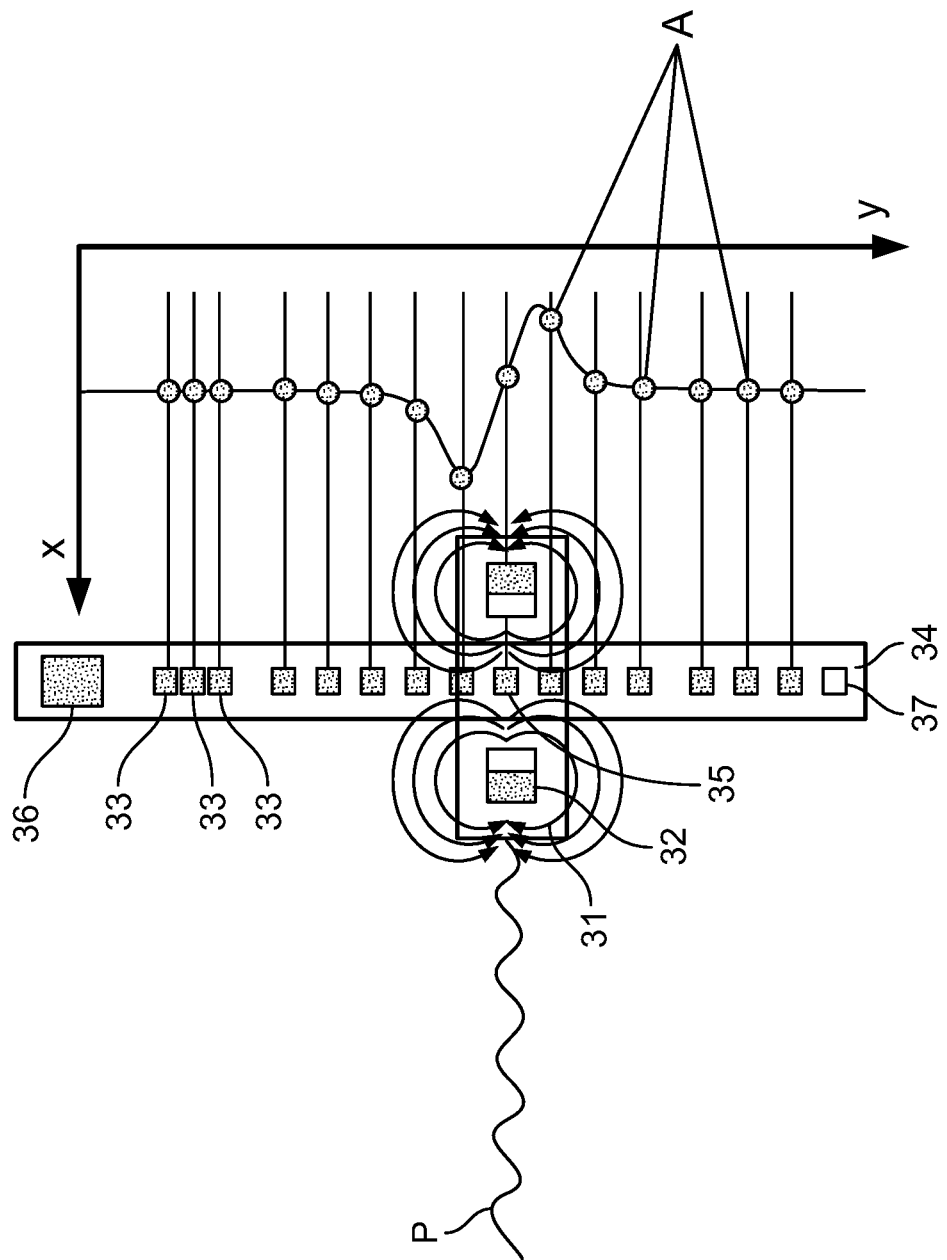
FIG. 16 is a schematic view of a measuring device for measuring a level of liquid in a container according to the invention.

A measuring device for measuring a level P of liquid in a container according to another embodiment of the invention is shown in FIGS. 16-20. The measuring device shown in FIG. 16 has a hollow cylindrical magnet 32 shown in FIG. 17 with a longitudinal axis aligned parallel to a sensor line 34. The magnet 32 is magnetized radially with respect to the longitudinal axis. In the shown embodiment, the sensors 33 of the sensor line 34 are magnetoresistive sensors with barber-pole structures. The sensors 33 could alternatively be Wheatstone bridges with resistance strips positioned orthogonal to one another and inclined by 45° on average relative to the sensor line 34 longitudinal direction. Other similar structural elements are depicted with reference numbers ending in the same numerals as in the embodiment of FIGS. 1-5. The measuring device as shown in FIG. 16 also has a temperature sensor 37.

The sensor line 34, as shown in FIGS. 16-20, has a support field oriented orthogonally to a longitudinal direction of the sensor line 34. The support field stabilizes the output curve shown in FIG. 20, as described in DE 10 2010 025 170 B4, for example. The sensor 33 output signal shown in FIG. 19 is dependent on the north-south alignment of the magnetic field of FIG. 18 generated by the float 31, and decreases the ambiguities when determining the float 31 position, enabling a reduction in the sensor 33 density along the sensor line 34.

A measuring device for measuring a level P of liquid in a container according to another embodiment of the invention is shown in FIGS. 21-26. The measuring device shown in FIG. 21 has a hollow cylindrical magnet 42 shown in FIG. 22 with a longitudinal axis aligned parallel to a sensor line 44. The magnet 42 is magnetized axially with respect to the longitudinal axis. The sensors 43 of the sensor line 44 are sensors of the rotation sensor type, i.e. AMR sensors with two Wheatstone bridges rotated by 45°, as described in DE10308030B4 for example. Other similar structural elements are depicted with reference numbers ending in the same numerals as in the embodiment of FIGS. 1-5.

The sensor line 44, as shown in FIGS. 21-25, has a support field created by a support magnet oriented orthogonally to a longitudinal direction of the sensor line 44. The magnetoresistive rotation sensors used as sensors 43 of the sensor line 44 generate bridge output signals including a sin-type and a cos-type field angle-dependent sensor signal, as shown in FIG. 24. An evaluation of both bridge signals permits, irrespective of the location of the magnet 42, a detection of the temperature-dependent sensor 43 signal amplitude, knowledge of which permits conclusions to be drawn regarding the currently prevailing operating temperature. An evaluation of both bridge signals shown in FIG. 24 also makes it possible to determine, independently of the temperature-dependent sensor 43 amplitude, a field angle at the sensor 43 location and thus to measure a level P which is largely temperature-independent. If materials having the same temperature coefficients are used for the support magnet and magnet 42, then the field angles at the sensors 43 and thus the level P obtained when evaluating the sensor 43 signals are practically unchanged when the temperature changes.

The support field stabilizes the output curves shown in FIG. 25, as described in DE 10 2010 025 170 B4, for example. The sensor 43 bridge output signals shown in FIG. 24 are dependent on the north-south alignment of the magnetic field of FIG. 23 generated by the float 31. The support field decreases the ambiguities when determining the float 31 position, enabling a reduction in the sensor 33 density along the sensor line 34.

Figure 21:
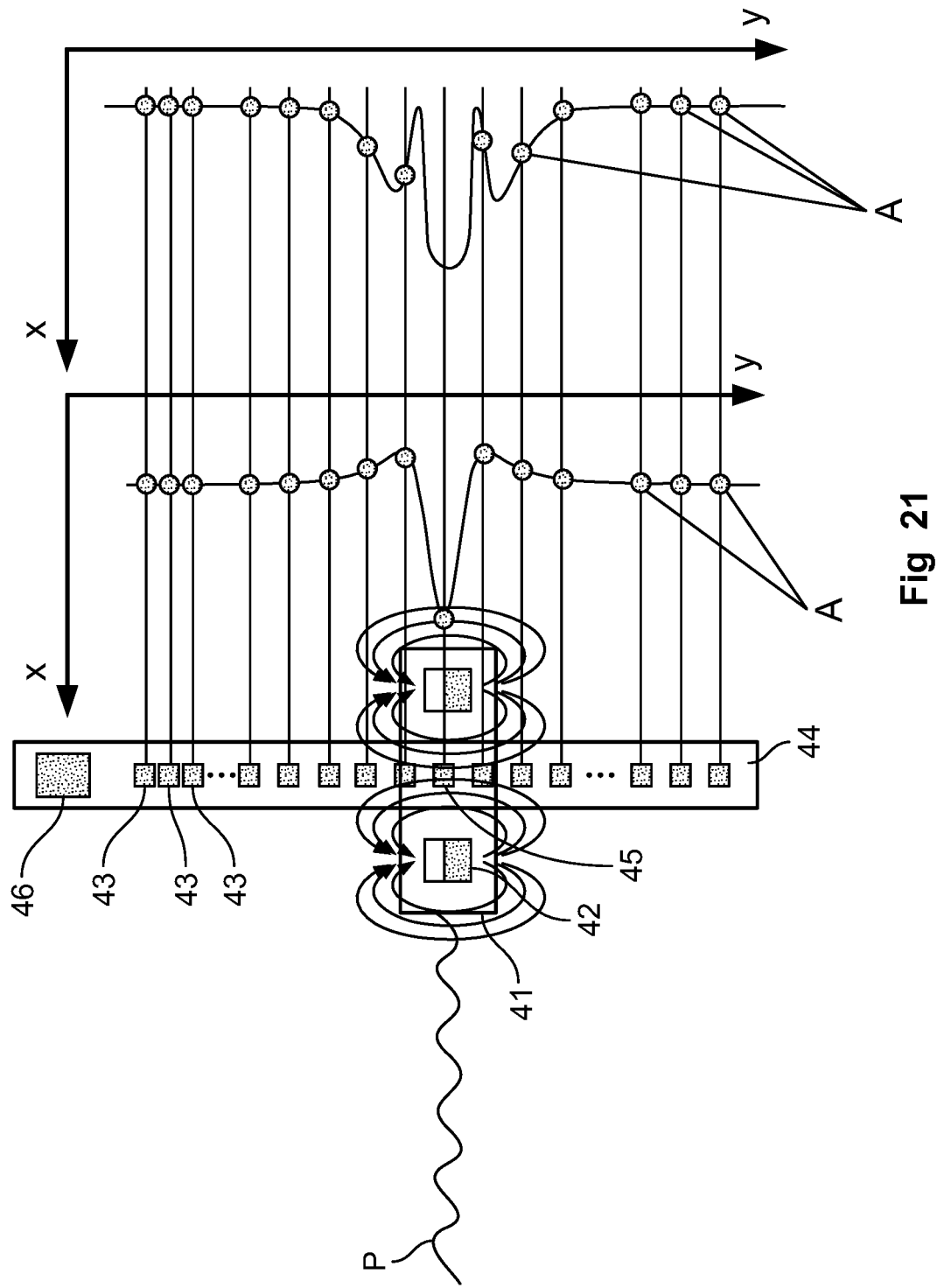
FIG. 21 is a schematic view of a measuring device for measuring a level of liquid in a container according to the invention.

FIG. 21 shows, corresponding to FIG. 25, output curves of each of the two Wheatstone bridges of the rotation sensor 43, the two Wheatstone bridges rotated by 45° with respect to each other. Likewise, in FIGS. 24 and 25, the respective upper diagrams show the sensor 43 output signal and output curve for one Wheatstone bridge, while the respective lower diagrams show the sensor 43 output signal and output curve for the other Wheatstone bridge rotated by 45°.

Figure 26B:
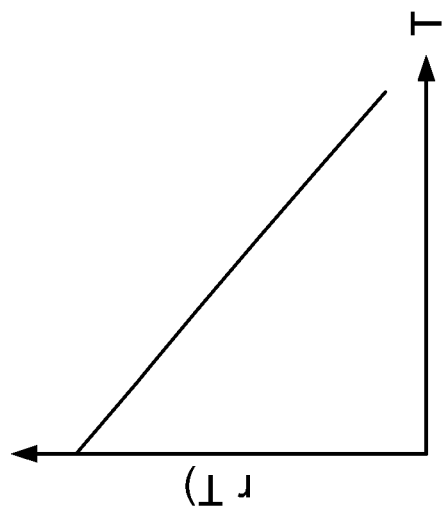
FIG. 26b is a graph of the relationship between the sensor output signals of FIG. 26a and a temperature.
Figure 26A:
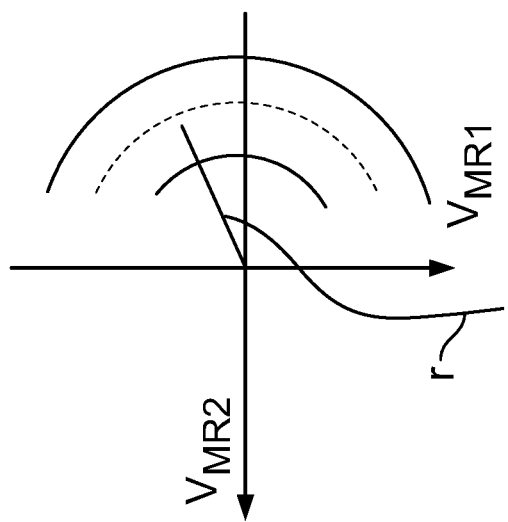
FIG. 26a is a graph of a relationship between the sensor output signals of FIG. 24.

As shown in FIG. 26a, the absolute value of the sum of the squares of the two bridge output signals is between a lower value and an upper value and depends on the temperature. The following relationship applies:

$$r=\sqrt{V_{MR1}^2+V_{MR2}^2},\ r(T_1)=r(T_0)\cdot(1+(T_1-T_0)\cdot TK)$$

in which T reflects the temperature, VMR1 the output signal of the one bridge signal, VMR2 the output signal of the second bridge signal, and TK refers to the material-dependent temperature coefficient. Further, r(T0) describes the signal amplitude at a reference temperature T0. FIG. 26b shows that there is a linear relationship between the sum of the squares of the two bridge output signals and the temperature, such that it is possible to ascertain the temperature from the root of the sum of the squares of the two bridge output signals.

A measuring device for measuring a level P of liquid in a container according to another embodiment of the invention is shown in FIGS. 27-31. The measuring device shown in FIG. 27 has a hollow cylindrical magnet 52 shown in FIG. 23 with a longitudinal axis aligned parallel to a sensor line 54. The magnet 52 is magnetized radially with respect to the longitudinal axis. The sensors 53 of the sensor line 54 are sensors of the rotation sensor type, i.e. AMR sensors with two Wheatstone bridges rotated by 45°, as described in DE10308030B4 for example. Other similar structural elements are depicted with reference numbers ending in the same numerals as in the embodiment of FIGS. 1-5.

The sensor line 54, as shown in FIGS. 27-31, has a support field created by a support magnet oriented orthogonally to a longitudinal direction of the sensor line 44. The support field stabilizes the output curves shown in FIG. 31, as described in DE 10 2010 025 170 B4, for example. The support field decreases the ambiguities when determining the float 51 position, enabling a reduction in the sensor 53 density along the sensor line 54.

Figure 27:
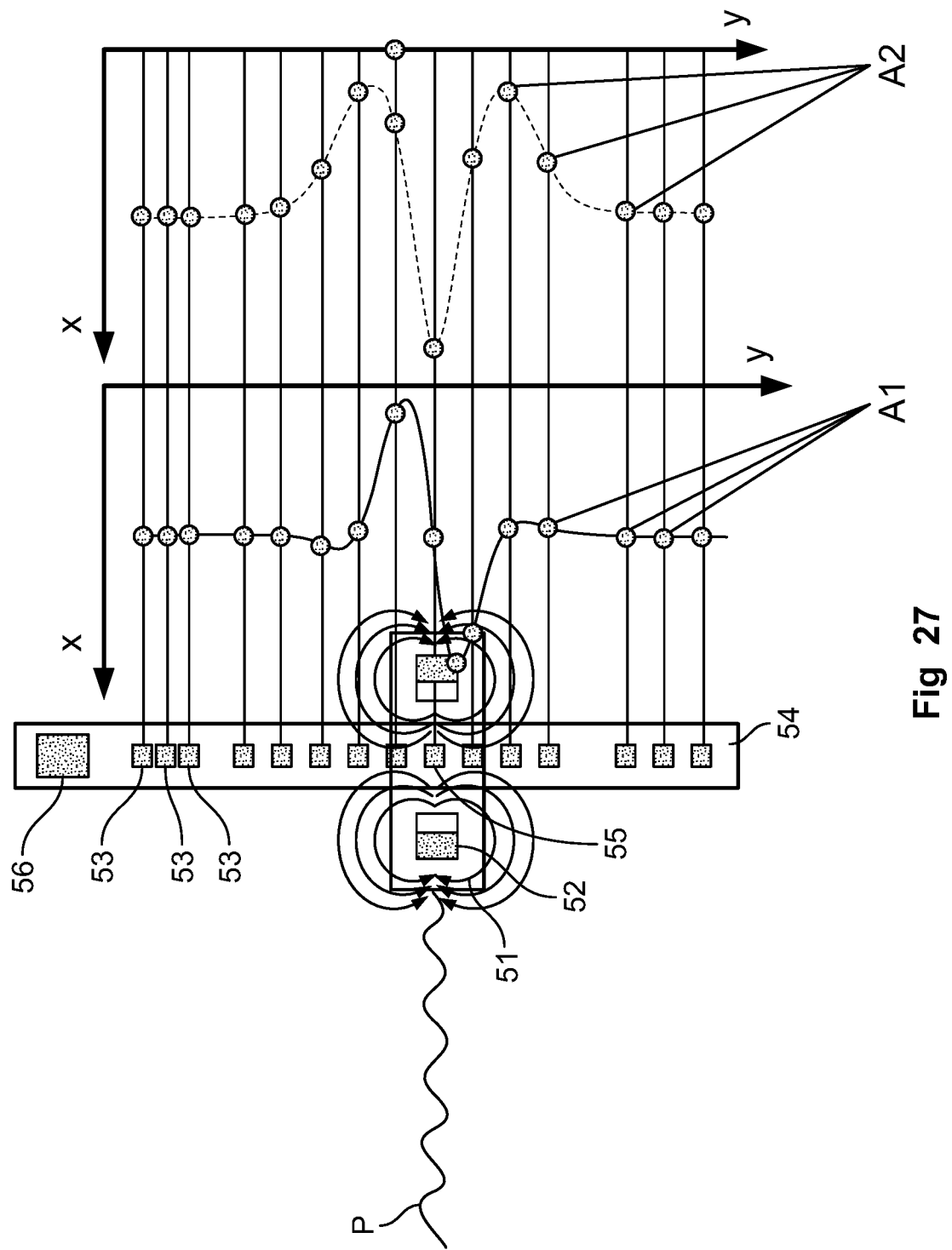
FIG. 27 is a schematic view of a measuring device for measuring a level of liquid in a container according to the invention.
Figures 28, 29, 30, 31:
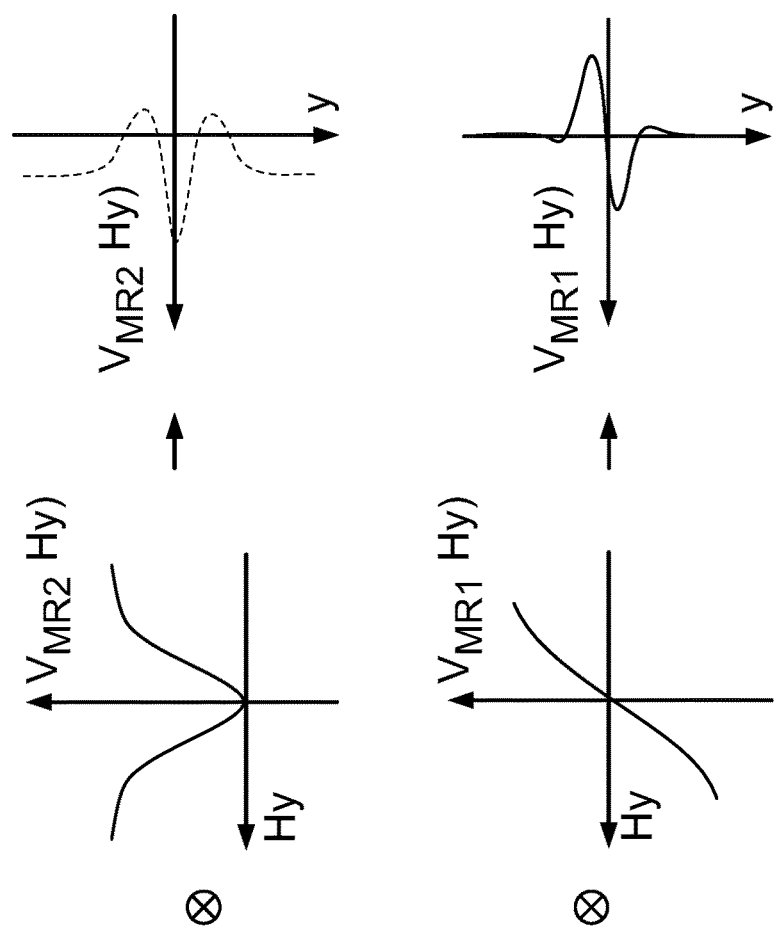
FIG. 28 is a sectional view of a float of the measuring device of FIG. 27.
FIG. 29 is a graph of a magnetic field generated by a magnet of the float of FIG. 28.
FIG. 30 is a graph of sensor output signals of the measuring device of FIG. 27.
FIG. 31 is a graph of sensor output curves of the measuring device of FIG. 27.

FIG. 27 shows, corresponding to FIG. 31, output curves of each of the two Wheatstone bridges of the rotation sensor 53, the two Wheatstone bridges rotated by 45° with respect to each other. Likewise, in FIGS. 30 and 31, the respective upper diagrams show the sensor 53 output signal and output curve for one Wheatstone bridge, while the respective lower diagrams show the sensor 53 output signal and output curve for the other Wheatstone bridge rotated by 45°.

Other embodiments of the present invention are shown in FIGS. 32-38.

Figure 32:
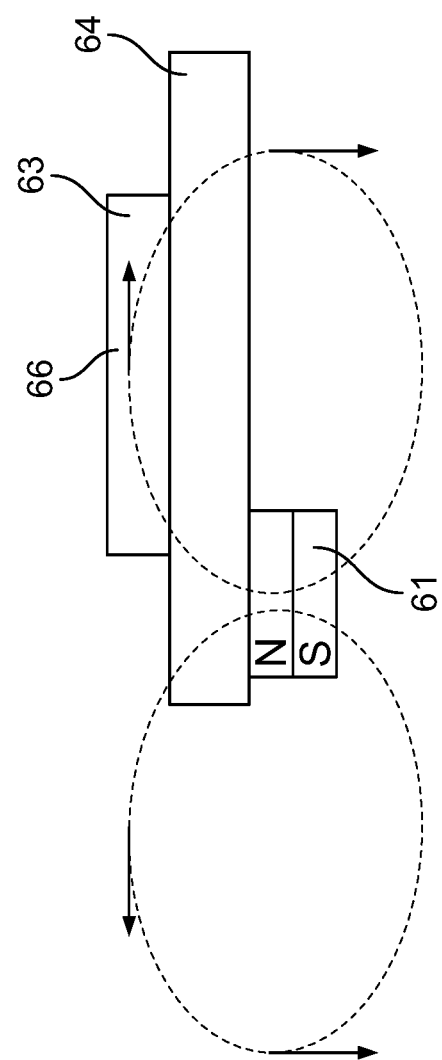
FIG. 32 is a schematic view of a support field magnet and a sensor of a measuring device for measuring a level of liquid in a container according to the invention.

FIG. 32 shows a support field magnet 61 and a sensor 63 disposed on a printed circuit board 64 which serves as the aforementioned sensor line. The sensor 63 is disposed on a first side of the printed circuit board 64 and the support field magnet 61 is disposed on an opposite side of the printed circuit board 64. Magnetic field lines of the support field generated by the support field magnet 61 are shown as dashed lines. The arrow 66 shows that the support field in the region of the sensor 63 extends only in one direction perpendicular to the sensor line 64 and does not extend in the height direction of the sensor 63. In the above embodiments, one support field magnet 61 is assigned to each sensor 63 of the sensor line in the manner shown in FIG. 32.

Figure 33:
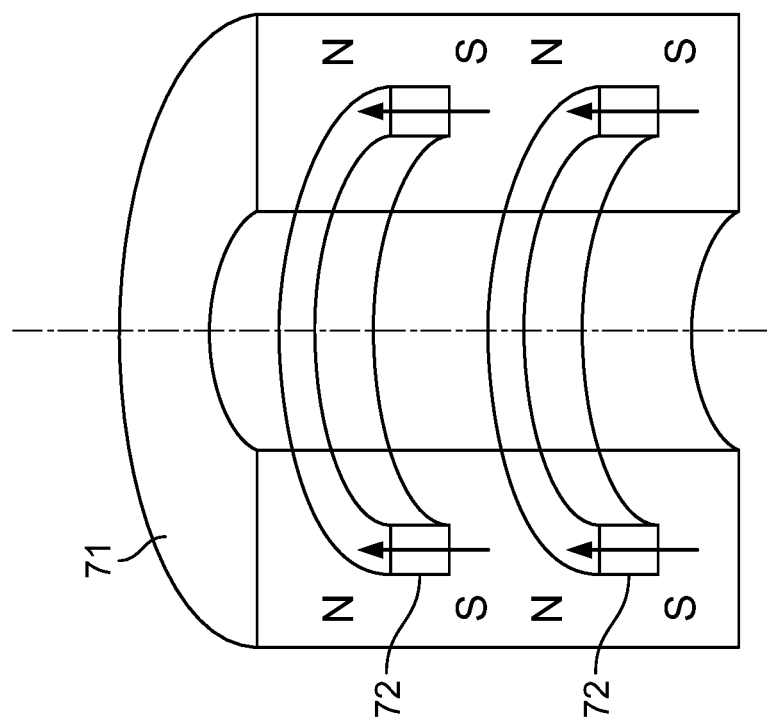
FIG. 33 is a sectional view of a float.

FIG. 33 shows a float 73 having a plurality of hollow cylinder-shaped magnets 72, which are axially magnetized. By using a plurality of hollow-cylindrical magnets 72, the strength of the magnetic field can be increased. In the shown embodiment, two magnets 72 are disposed in the float 71, but one with ordinary skill in the art would understand that the number of magnets 72 could vary.

Figure 34:
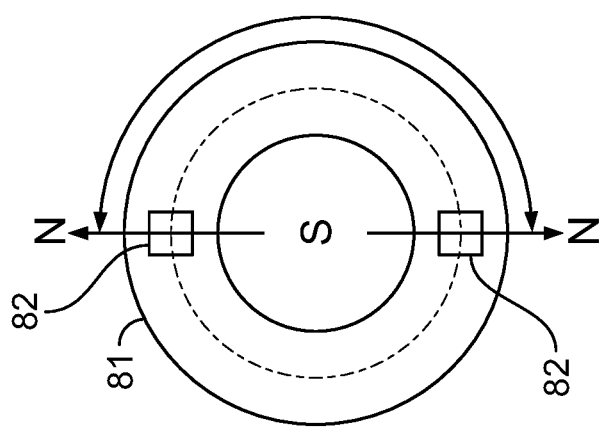
FIG. 34 is a plan view of a float.

FIG. 34 shows a float 81 having a plurality of bar magnets 82 radially magnetized and offset from one another by 180°. The bar magnets 82 are disposed in a radially symmetrical manner in a plane which intersects the magnets and is perpendicular to a longitudinal axis of the bar magnets 82.

Figure 35:
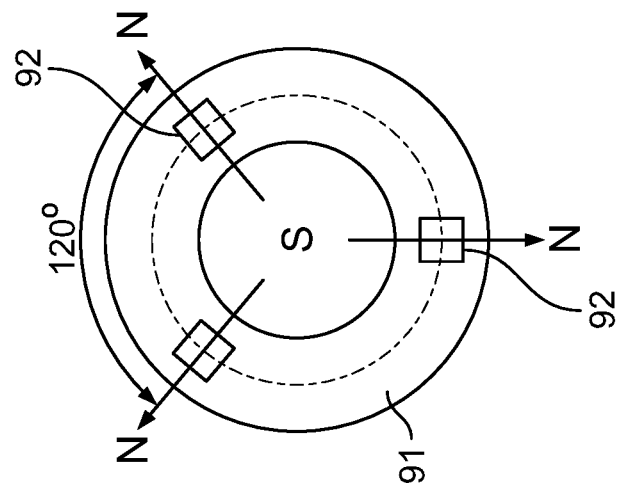
FIG. 35 is a plan view of a float.

FIG. 35 shows a float 91 having three bar magnets 92 radially magnetized and offset from one another by 120°. The bar magnets 92 are disposed in a radially symmetrical manner in a plane which intersects the magnets and is perpendicular to a longitudinal axis of the bar magnets 92.

Figure 36:
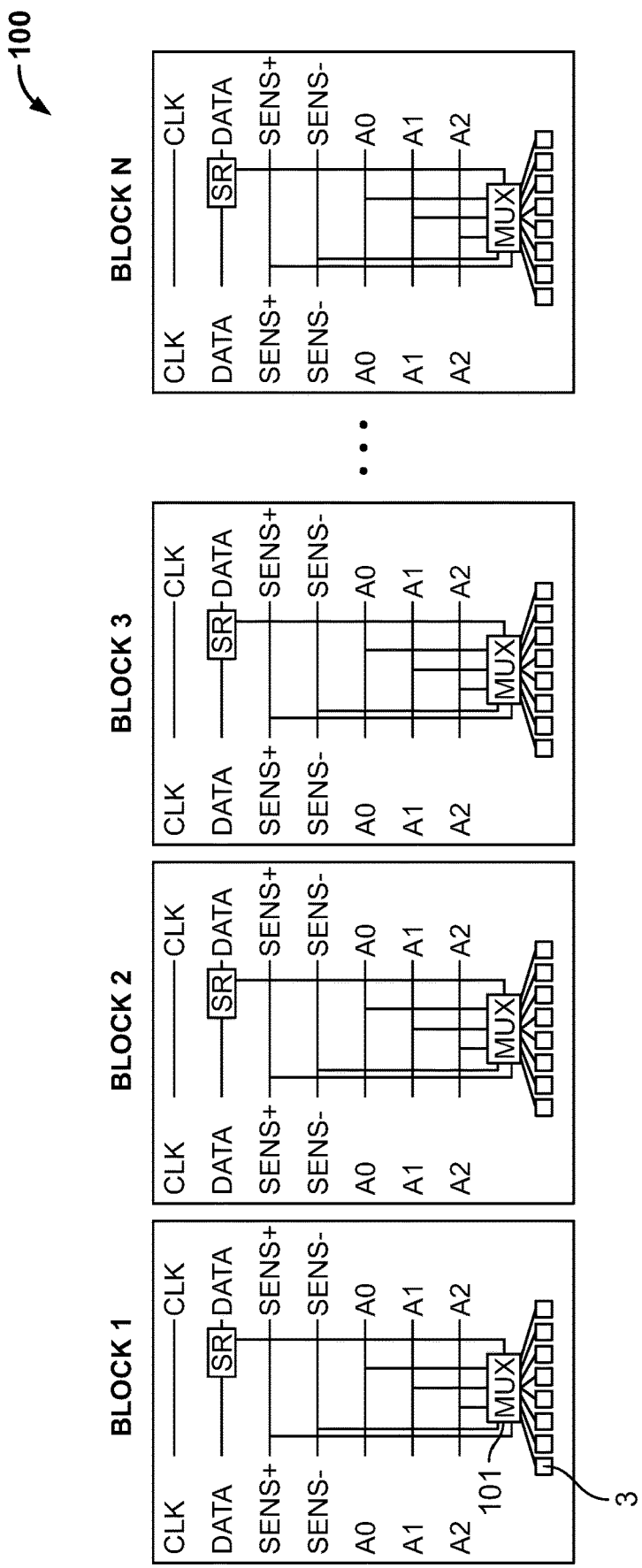
FIG. 36 is a schematic view of a BUS system of a measuring device for measuring a level of liquid in a container according to the invention.

FIG. 36 shows a BUS system 100 for the measuring device according to the invention. The sensors 3 of the measuring device are disposed spaced apart from one another along the sensor line 4. In each case, eight sensors 3 are logically merged into one block of the BUS system 100. In FIG. 36, the measuring device has n blocks and thus 8n sensors. Each block has a multiplexer 101. Input signals of the respective multiplexer 101 are the analogue measurement values of the respective sensor 3 assigned to the respective block. As an output signal, the multiplexer provides an analogue measurement value on the DATA line of the BUS system 100 and the respective analogue measurement value of that sensor 3 which should be connected corresponding to the currently existing activation state of the multiplexer 101. The multiplexer 101 is supplied with power via the Sens+ and Sens− lines. The multiplexer can be activated via the A0, A1, A2 lines, such that it can transmit the analogue measurement values of the sensors on the DATA line one after the other.

Figure 37:
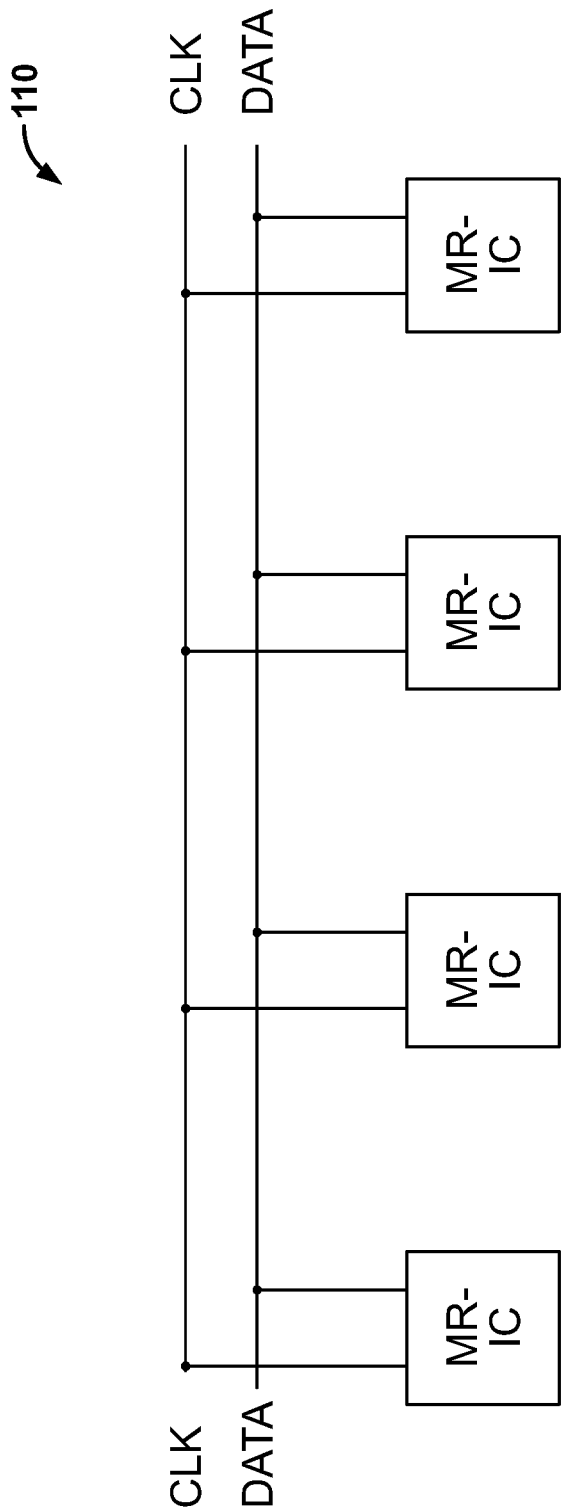
FIG. 37 is a schematic view of a BUS system of a measuring device for measuring a level of liquid in a container according to the invention.
Figure 38:
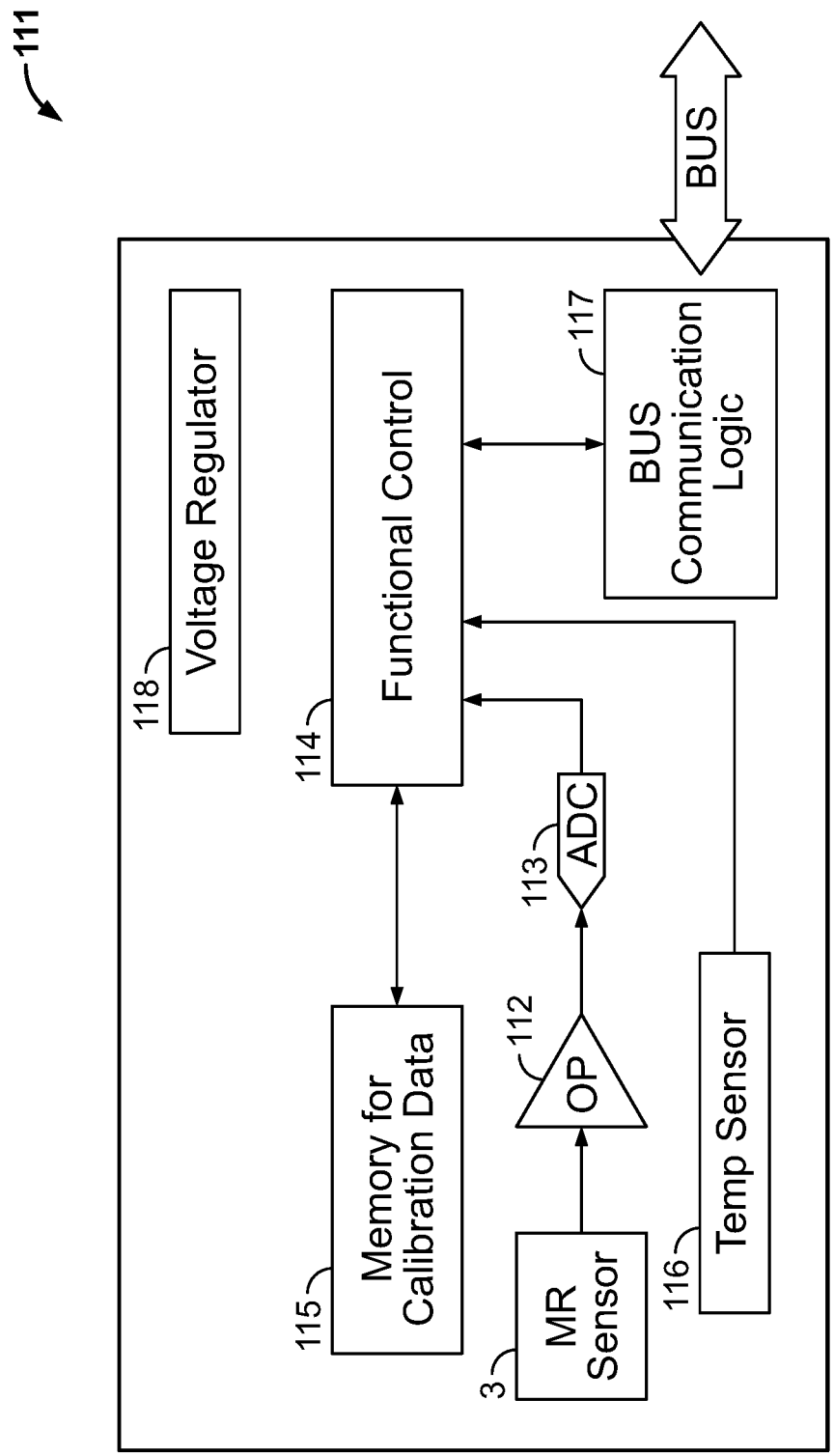
FIG. 38 is a schematic view of an integrated circuit of the BUS system of FIG. 37.

FIGS. 37 and 38 show a BUS system 110 for the measuring device according to the invention. Alongside the non-depicted supply lines, the BUS system 110 has a CLK line and a DATA line. There is assigned to each sensor 3 an integrated circuit MR_IC 111, shown in FIG. 38, which processes the respective analogue measurement value of the sensor 3 and converts it into a digital measurement value, in order to then transmit this digital measurement value on the DATA line when the respective circuit 111 is activated appropriately.

The integrated circuit 111 can have the basic design shown in FIG. 38. According to this, an analogue measurement value from the sensor 3 is fed to the circuit 111. The analogue measurement value is amplified with an amplifier "OP" 112 and converted into a digital measurement value by the converter 113. The digital measurement value is fed into a functional block 113. In addition, calibration values from a memory 115 and a temperature signal from a temperature sensor 116 are fed to this functional block 114. Using this information, the functional block can perform a calibration of the digital measurement value and a temperature compensation. The appropriately adapted signal is fed to a communication member 117 which coordinates communication with the BUS 110. The integrated circuit 111 additionally has a supply unit 118.

The measuring devices according to the embodiments of the invention described above are used when measuring the level of an ink in a container, when measuring the level of a solvent in a container, or when measuring the level of a urea-containing liquid in a container. The measuring devices can be installed together with further sensor units which detect the physical or chemical measurement variables which, for example, make it possible to assess the quality of the liquid or to ascertain a liquid level.

What is claimed is:

1. A measuring device for measuring a level of a liquid in a container, comprising:
   a sensor line having a plurality of magnetic-field sensors and a support field magnet generating a magnetic support field in the plurality of magnetic-field sensors, at least one of the plurality of magnetic-field sensors uses a magnetoresistive effect or is a Hall effect sensor or a magnetoresistor or an extraordinary magnetoresistive sensor; and
   a float movable along and relative to the sensor line between a first measuring location and a second measuring location, the float having a magnet generating a magnetic field extending substantially parallel to the sensor line at both the first measuring location and the second measuring location.

2. The measuring device of claim 1, wherein the magnetic-field sensors are disposed spaced apart from one another along the sensor line.

3. The measuring device of claim 2, wherein the sensor line extends linearly.

4. The measuring device of claim 1, wherein at least one of the plurality of magnetic-field sensors uses an anisotropic magnetoresistive effect.

5. The measuring device of claim 1, wherein at least one of the plurality of magnetic-field sensors generates an output signal independent of a magnetic field direction.

6. The measuring device of claim 1, wherein the float has a plurality of magnets.

7. The measuring device of claim 6, wherein the plurality of magnets are aligned axially along a longitudinal axis of the float.

8. The measuring device of claim 6, wherein the plurality of magnets are aligned radially relative to a longitudinal axis of the float.

9. The measuring device of claim 6, wherein the plurality of magnets are disposed in a radially symmetrical manner in a plane perpendicular to a longitudinal axis of the float.

10. The measuring device of claim 1, wherein the magnet is a hollow cylinder.

11. The measuring device of claim 10, wherein a longitudinal axis of the magnet extends parallel to the sensor line.

12. The measuring device of claim 11, wherein the magnet is magnetized axially parallel to the longitudinal axis of the magnet.

13. The measuring device of claim 11, wherein the magnet is magnetized radially with respect to the longitudinal axis of the magnet.

14. The measuring device of claim 1, further comprising a temperature sensor measuring a temperature of the liquid.

15. A measuring device for measuring a level of a liquid in a container, comprising:

a sensor line having a plurality of magnetic-field sensors containing no movable components and a support field magnet generating a magnetic support field in the plurality of magnetic-field sensors; and a float movable along and relative to the sensor line between a first measuring location and a second measuring location, the float having a magnet generating a magnetic field extending substantially parallel to the sensor line at both the first measuring location and the second measuring location.

16. The measuring device of claim 15, wherein the magnetic-field sensors are disposed spaced apart from one another along the sensor line.

17. A method for measuring a level of a liquid in a container, comprising:

providing a measuring device including a sensor line having a plurality of magnetic-field sensors and a support field magnet generating a magnetic support field in the plurality of magnetic-field sensors, at least one of the plurality of magnetic-field sensors uses a magnetoresistive effect or is a Hall effect sensor or a magnetoresistor or an extraordinary magnetoresistive sensor, and a float movable along and relative to the sensor line between a first measuring location and a second measuring location, the float having a magnet generating a magnetic field extending substantially parallel to the sensor line at both the first measuring location and the second measuring location; and determining a position of the float along the sensor line based on a comparison of output signals of the plurality of magnetic-field sensors to values stored in a memory.

18. The method of claim 17, wherein the method is used to measure the level of an ink, the level of a solvent, or the level of a urea-containing liquid.

* * * * *